United States Patent Office 2,935,431
Patented May 3, 1960

2,935,431

METHOD OF COATING TITANIUM

Richard Elliott Shaw and Norman Morin Ness, Windsor, England, assignors to Imperial Chemical Industries Limited, a corporation of Great Britain No Drawing. Application June 3, 1954
Serial No. 434,339

Claims priority, application Great Britain June 11, 1953

7 Claims. (Cl. 148—6.14)

This invention relates to solutions for use in the production of coatings on titanium and to processes of coating titanium by means of such solutions.

It is known to apply to metals crystalline coatings of oxides and salts for the purpose of facilitating the plastic deformation of the metals. Details of such a process will be found in the Singer British Patent No. 455,077 in which specification it is disclosed that coatings such as phosphates and oxalates may be used.

In recent years great progress has been made in the production of titanium but it has been found that solutions of phosphates or oxalates which give satisfactory coatings on iron, steel, stainless steel and aluminium to facilitate the plastic deformation of these metals do not give satisfactory coatings on titanium, if in fact they give any coating at all. For example, no coatings could be obtained on titanium from a solution containing oxalic acid, ferric oxalate and sodium chloride.

However it has been found that certain oxalate solutions will give coatings on titanium, which coatings serve to reduce the possibility of galling, seizing, scuffing, welding and fretting occurring during pressing, forming, drawing or other plastic deformations.

The present invention provides an aqueous acidic solution containing ferric, oxalate and fluoride ions.

The present invention also provides a method in which a continuous, closely adherent, crystalline coating is produced on a surface of titanium by treatment of the titanium surface with an acidic aqueous solution containing ferric, oxalate and fluoride ions.

The present invention also provides a method for the plastic deformation of titanium in which a closely-adherent crystalline coating is formed on the titanium by treatment with a solution of this invention before the titanium is subjected to plastic deformation.

In its simplest form the solution of this invention is an aqeosu solution of ferric oxalate and hydrofluoric acid and may conveniently be formed by dissolving ferric oxalate and hydrogen fluoride in water. Since hydrogen fluoride is commercially available as an aqueous solution this solution may be diluted to the required concentration and ferric oxalate may then be dissolved in the diluted solution. However, since the insoluble ferrous oxalate is cheaper than ferric oxalate a convenient method of preparing the solutions of this invention is to convert ferrous oxalate into ferric oxalate and so dissolve it, e.g., by means of an oxidising agent such as hydrogen peroxide, sodium nitrite or sodium chlorate in stoichiometric proportion.

Rather than use hydrofluoric acid a more convenient method is to use a mixture of solid substances which yield hydrofluoric acid when dissolved in water, e.g. oxalic acid and a salt of hydrofluoric acid such as sodium fluoride or ammonium bi-fluoride, since the reactive ingredients of the coating composition may then be marketed in the form of a powder, thus avoiding the difficulties involved in the transportation of corrosive fluids.

The coatings are believed to be produced by the action of the acid solution on the titanium to form hydrogen which in the nascent state reduces the ferric oxalate in the solution to ferrous oxalate, this insoluble compound being deposited as a film on the metal surface. The formation of the coating is therefore usually accompanied by the formation of hydrogen bubbles on the surface of the metal though in certain circumstances, presumably those in which all the hydrogen is used up as it formed, very thin films may be slowly formed without any visible generation of hydrogen. At the other extreme it is important to avoid generating hydrogen too vigorously as this results in the formation of heavy loose friable deposits which may even be dislodged from the metal surface by the vigorous effervescence.

The thickness of adherent coatings will normally be dependent on the time of immersion in the coating liquid though a stage is finally reached when the coating completely seals the metal surface and prevents any further reaction.

The speed of coating may also be controlled to a certain extent by adjusting the temperature of the coating solution. In addition, if a solution is not sufficiently active for a given purpose its action may be speeded up by the addition of a salt of hydrofluoric acid such as sodium fluoride. If, however, it is too active its action may be slowed down by means of zinc dihydrogen phosphate, ammonium dihydrogen phosphate, sodium, zinc and magnesium chlorides and potassium thiocyanate.

The invention may be illustrated with reference to the following examples.

*Example 1*

A solution at 120° F. of 5 gms. of ferric oxalate and 0.5 ml. of 40% hydrofluoric acid in 100 mls. of water had no effect on titanium panels immersed in it for five minutes. The solution was modified by further additions of 0.5 ml. of 40% hydrofluoric acid and the effect was as follows:

| Total acid added | Effect at 120° F. |
| --- | --- |
| 1.0 ml | No reaction till 3 mins. elapsed. |
| 1.5 ml | Vigorous reaction immediately. Substantially complete 1.5 mins. |
| 2.0 ml | Vigorous reaction immediately. Substantially complete 1 min. |
| 2.5 ml | Do. |
| 3.0 ml | Do. |
| 3.5 ml | Do. |
| 4.0 ml | Coating removed as formed by gassing. |

*Example 2*

A solution of 2 gms. oxalic acid and 1 gm. sodium fluoride in 100 mls. water was modified by additions of ferric oxalate. The effect on titanium panels of immersion for 5 minutes in these solutions was as follows:

| Total oxalate added | Effect at 120° F. |
| --- | --- |
| 0.5 gms | Trace of coating. |
| 1.0 gms | Light coating. |
| 2.0 gms | Loose coating. |
| 3.0 gms | Do. |
| 4.0 gms | Do. |
| 5.0 gms | Light coating. |
| 7.0 gms | No coating. |
| 10.0 gms | Do. |

*Example 3*

Continuous, closely adherent crystalline coatings were obtained by immersing titanium panels for two minutes in a solution of 180° F. prepared from:

Ferrous oxalate _____ gms__ 10
Hydrogen peroxide (100 vol.) _____ mls__ 4
40% hydrofluoric acid _____ mls__ 5
Water _____ mls__ 200

Example 4

Using a solution at 170° F. prepared from:

| | |
|---|---|
| Ferrous oxalate | gms 10 |
| Sodium nitrite | gms 4 |
| 40% hydrofluoric acid | mls 5 |
| Water | mls 100 | continuous, closely adherent, crystalline coatings were obtained on titanium panels after immersion for twenty minutes.

Example 5

A solution at 120° F. of:

| | |
|---|---|
| Ferric oxalate | gms 5 |
| Oxalic acid | gms 5 |
| Ammonium bifluoride | gms 5 |
| Water | mls 85 | reacted too violently on titanium sheet but could be used at that temperature for coating titanium wire.

Example 6

A series of solutions containing sodium fluoride were prepared and their reaction at 120° F. on titanium panels tested. The solutions and the results were as follows:

| Solution constituents (in grams). | | | | Effect |
|---|---|---|---|---|
| Ferric Oxalate | Oxalic Acid | Sodium Fluoride | Water | |
| 5 | 5 | 3 | 87 | Too reactive. |
| 5 | 2 | 2 | 91 | Do. |
| 5 | 1 | 1 | 93 | Gave good coatings within three minutes. |

Example 7

Thin coatings were obtained on titanium panels by immersing for ten minutes in a solution at 130° F. containing:

| | Gms. |
|---|---|
| Ferric oxalate | 7.5 |
| Oxalic acid | 3 |
| Sodium fluoride | 1.5 |
| Potassium thiocyanate | 3.0 |
| Water | 150 |

However, it was found that thicker coatings were obtained by reducing the amount of thiocyanate by half and immersing in a solution at 140° F. for three to six minutes.

Example 8

The effect on titanium panels of coating solutions modified by the addition of sodium chloride was as follows:

| Solution constituents (in grams) | | | | | Effect at 120° F. |
|---|---|---|---|---|---|
| Ferric Oxalate | Oxalic Acid | Sodium Chloride | Sodium Fluoride | Water | |
| 5 | 2 | ------ | 1 | 92 | Coating within 1 min. and completed within 5 mins. |
| 5 | 2 | 1 | 1 | 91 | Coating within 2.5 mins. and completed within 5 mins. |
| 5 | 2 | 2 | 1 | 90 | No coating in 5 mins. |

The sodium chloride was found to have no effect on the nature of the coating but merely slowed down the coating action.

Example 9

Satisfactory coatings were obtained on titanium panels using solutions at 120° F. of:

| | A | B | C | D |
|---|---|---|---|---|
| Ferric oxalate | 5 | 5 | 5 | 5 |
| Oxalic acid | 2 | 2 | 2 | 2 |
| Sodium fluoride | 1 | 1 | 1 | 1 |
| Ammonium dihydrogen phosphate | 0.33-0.66 | | | |
| Zinc dihydrogen phosphate | | 0.1-1.0 | | |
| Zinc chloride | | | 1-2 | |
| Magnesium chloride | | | | 0.1-1.0 |
| Water | ad 100 | ad 100 | ad 100 | ad 100 |

All parts are in grams.

Example 10

Titanium wire of 0.11 inch diameter was treated for ten minutes with the following solution at 120° F.:

| | Gms. |
|---|---|
| Ferric oxalate | 4 |
| Oxalic acid | 2 |
| Sodium fluoride | 2 |
| Water | 92 |

After coating the wire was boiled in a 10% solution of industrial soap for a period of two minutes. The wire was then drawn at a speed of 40 feet per minute to a diameter of 0.098 inch, i.e. a 20.5% reduction. The reduced wire was then further reduced to 0.087 inch and then still further reduced to 0.078 inch, i.e. a total reduction of 49.5% was obtained.

As an alternative to boiling in soap solution the coated articles may be rubbed with lubricant such as the higher melting point calcium soap. In general, the coatings of the present invention are found to have good lubricant-holding properties.

What we claim is:

1. A process in which a continuous, closely adherent, crystalline coating is formed on a titanium surface by treating the said surface with an aqueous acidic solution consisting essentially of ferric, oxalate and fluoride ions in amounts sufficient to form said continuous, closely adherent, crystalline coating, said amounts being, by weight, within the range of from 0.15% to 2.6% ferric ion; 1.77% to 4.1% oxalate ion; and 0.4% to 3.3% fluoride ion.

2. The process of claim 1 in which the ferric ion is produced in situ by oxidation of ferrous ion with an oxidizing agent selected from the group consisting of hydrogen peroxide, alkali metal nitrites and alkali metal chlorates, in stoichiometric proportions.

3. The process of claim 1 in which the fluoride ion is produced from a mixture of substances which yield hydrofluoric acid when dissolved in water.

4. The process of claim 1 wherein said solution includes an ion selected from the group consisting of alkali metal and ammonium ions.

5. In a process involving the plastic deformation of titanium metal, the improvement which comprises forming a continuous, closely adherent crystalline coating on said titanium, prior to its deformation, by treating same with an aqueous acidic solution consisting essentially of ferric, oxalate and fluoride ions in amounts sufficient to form said continuous, closely adherent crystalline coating, said amounts being, by weight, within the range of from 0.15% to 2.6% ferric ion; 1.77% to 4.1% oxalate ion; and 0.4% to 3.3% fluoride ion.

6. Titanium metal having a continuous, closely adherent crystalline protective coating thereon, said coating having been applied by treating said metal with an aqueous acidic solution consisting essentially of ferric, oxalate and fluoride ions in amounts sufficient to form said continuous, closely adherent crystalline coating, said amounts being, by weight, within the range of from 0.15% to 2.6% ferric ion; 1.77% to 4.1% oxalate ion; and 0.4% to 3.3% fluoride ion.

7. The method of producing an adherent, protective coating on a metal surface in which the major constituent is titanium, which process comprises contacting the metal surface with an aqueous acidic solution of oxalate ion, ferric ion and fluoride ion, until an adherent, protective coating is formed thereon, the total iron content of said solution being in the range of 0.4–2.6% and the fluoride ion being so selected from the range of 0.4–3.3% as to produce a uniform, adherent oxalate coating.

References Cited in the file of this patent

UNITED STATES PATENTS

| | | |
|---|---|---|
| 2,550,660 | Amundsen | May 1, 1951 |
| 2,577,887 | Gibson | Dec. 11, 1951 |

FOREIGN PATENTS

| | | |
|---|---|---|
| 661,385 | Great Britain | Nov. 21, 1951 |

OTHER REFERENCES

Am. Machinist, June 11, 1951, page 152.